(12) United States Patent
Guegan et al.

(10) Patent No.: US 9,156,349 B2
(45) Date of Patent: Oct. 13, 2015

(54) TORQUE DISTRIBUTION CONTROL METHOD FOR A FOUR-WHEEL DRIVE MOTOR VEHICLE AND CORRESPONDING VEHICLE

(75) Inventors: Stephane Guegan, Versailles (FR); Richard Pothin, Jouars Pontchartrain (FR); Nicolas Romani, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 161 days.

(21) Appl. No.: 13/640,320

(22) PCT Filed: Apr. 11, 2011

(86) PCT No.: PCT/FR2011/050826
§ 371 (c)(1),
(2), (4) Date: Nov. 27, 2012

(87) PCT Pub. No.: WO2011/128569
PCT Pub. Date: Oct. 20, 2011

(65) Prior Publication Data
US 2013/0073167 A1    Mar. 21, 2013

(30) Foreign Application Priority Data
Apr. 12, 2010    (FR) .................................. 10 52770

(51) Int. Cl.
*B60K 17/34*   (2006.01)
*B60K 23/08*   (2006.01)
*B60W 30/186*  (2012.01)

(52) U.S. Cl.
CPC ............. *B60K 17/34* (2013.01); *B60K 23/0808* (2013.01); *B60W 30/186* (2013.01); *B60W 2510/0291* (2013.01); *B60W 2520/263* (2013.01)

(58) Field of Classification Search
CPC .... B60K 23/0808; B60K 23/04; B60K 17/35; B60K 17/344; B60K 17/3462; B60K 23/08; B60K 17/3467; B60K 17/3505; B60K 17/351; B60K 28/16; B60K 28/165; F16H 48/12; F16H 48/27; F16H 48/32; F16H 2037/0873; F16H 2048/366
USPC ........... 701/69, 70, 41, 88, 36, 37, 38, 43, 89, 701/90; 180/197, 247, 249, 233, 248, 242, 180/271; 475/198, 199, 201, 204, 320, 303
See application file for complete search history.

(56) References Cited

U.S. PATENT DOCUMENTS 4,829,849 A * 5/1989 Masuda et al. .................. 74/650
4,923,029 A * 5/1990 Lanzer .......................... 180/248

(Continued)

FOREIGN PATENT DOCUMENTS

JP    61 275028    12/1986
JP    4 103433     4/1992

OTHER PUBLICATIONS

U.S. Appl. No. 13/640,942, filed Oct. 12, 2012, Febrer, et al.

(Continued)

*Primary Examiner* — John R Olszewski
*Assistant Examiner* — Truc M Do
(74) *Attorney, Agent, or Firm* — Oblon, McClelland, Maier & Neustadt, L.L.P.

(57) ABSTRACT

A motor vehicle with four drive wheels mounted on first and second axles, including: a transfer shaft connected to the first axle and a controlled coupling that can transfer part of the torque from the transfer shaft to the second axle; a mechanism determining respective speeds of the first and second axles, and a torque distribution control system configured to determine a slip value representative of the speed difference between the first and second axles and to control the coupling. The torque distribution control system is further configured to control the coupling such as to suppress any torque transfer via the coupling when the average slip value over a predetermined period exceeds a threshold.

9 Claims, 3 Drawing Sheets

(56) References Cited

U.S. PATENT DOCUMENTS

| | | | | |
|---|---|---|---|---|
| 4,960,011 A * | 10/1990 | Asano | | 74/650 |
| 5,176,235 A * | 1/1993 | Williams | | 192/58.4 |
| 5,219,038 A * | 6/1993 | Hamada et al. | | 180/248 |
| 5,220,975 A * | 6/1993 | Zimmer et al. | | 180/197 |
| 5,358,454 A * | 10/1994 | Bowen et al. | | 475/94 |
| 5,456,642 A * | 10/1995 | Frost | | 475/93 |
| 5,582,263 A * | 12/1996 | Varma et al. | | 180/247 |
| 5,690,201 A * | 11/1997 | Gassmann | | 192/35 |
| 6,161,643 A * | 12/2000 | Bober et al. | | 180/249 |
| 6,512,972 B1 * | 1/2003 | Glab et al. | | 701/69 |
| 6,754,615 B1 * | 6/2004 | Germann et al. | | 703/8 |
| 7,143,855 B2 * | 12/2006 | Hopper | | 180/247 |
| 7,330,785 B2 * | 2/2008 | Odenthal et al. | | 701/70 |
| 7,966,117 B2 * | 6/2011 | Olsson | | 701/72 |
| 8,443,954 B2 * | 5/2013 | Quehenberger et al. | | 192/84.6 |
| 2001/0032768 A1 * | 10/2001 | Gassmann et al. | | 192/48.92 |
| 2002/0032096 A1 * | 3/2002 | Gassmann | | 475/231 |
| 2003/0004027 A1 * | 1/2003 | Gassmann | | 475/221 |
| 2003/0062770 A1 * | 4/2003 | Sasaki et al. | | 303/152 |
| 2005/0230172 A1 * | 10/2005 | Hopper | | 180/247 |
| 2007/0039770 A1 * | 2/2007 | Barrette et al. | | 180/197 |
| 2007/0185638 A1 * | 8/2007 | Odenthal et al. | | 701/70 |
| 2008/0257629 A1 * | 10/2008 | Olsson | | 180/197 |
| 2009/0221393 A1 * | 9/2009 | Kassler | | 475/205 |
| 2010/0089685 A1 * | 4/2010 | Quehenberger et al. | | 180/383 |
| 2010/0094519 A1 * | 4/2010 | Quehenberger et al. | | 701/69 |
| 2012/0041656 A1 * | 2/2012 | Martin et al. | | 701/58 |

OTHER PUBLICATIONS

International Search Report Issued Aug. 17, 2011 in PCT/FR11/50826 Filed Apr. 11, 2011.

* cited by examiner

TORQUE DISTRIBUTION CONTROL METHOD FOR A FOUR-WHEEL DRIVE MOTOR VEHICLE AND CORRESPONDING VEHICLE

The present invention relates generally to four-wheel drive vehicles equipped with a system for controlling the distribution of engine torque between a first axle and a second axle, and capable additionally of controlling a coupling mounted between the two axles.

In these vehicles, the engine torque is distributed between the first axle and the second axle, the sum of the torques transmitted to both axles being equal to the engine input torque. The first axle is linked to a transfer shaft to which the second axle is joined by means of said coupling. Only the first axle permanently receives a torque; the second axle is more or less joined by the coupling controlled by the distribution control system. Thus the level of torque transmitted onto each of the axles can be adjusted by the control system as a function, for example, of an operating mode of the vehicle.

In a first operating mode, the engine torque is entirely transmitted to the first axle and no torque is transmitted to the second axle. In a second operating mode, the coupling level of the actuator is fixed, and the distribution of the torque between the two axles depends on the conditions of driving (slope, etc) and of grip. In a third operating mode, the torques transmitted to the two axles are constantly adjusted as a function of the driving conditions for the vehicle.

In four-wheel drive vehicles, a slip phenomenon can also arise. The slip corresponds to a difference in rotation speed between the front and rear axles. Slip can be a normal phenomenon, for example in the case of a change of gear. It can also be the consequence of a difference in rolling radius, for example in the case of a poor tire fitting or a puncture. The slip is then permanent and it can lead to overheating and/or deterioration of the coupling.

This is because the coupling is a mechanical transmission system which can by way of example implementation be formed by several disks bathing in oil, some joined to a shaft linked to the second axle and others to the transfer shaft. For normal operation, when there is a difference in speed between the transfer shaft and the shaft linked to the second axle, the disks shear the oil, the temperature of which increases, and then expands and thickens. The pressure on the disks increases and they end up driving one another. Thus, the difference in speed between the two shafts decreases and the temperature of the oil and of the coupling reduces. However, in the presence of a permanent slip, the disks continue to shear the oil which overheats until the coupling possibly deteriorates due to the latter heating up. If the coupling is based on a controlled clutch, the dry friction forces associated with the contact between the disks can bring about a deterioration by the wearing of the disks due to heating.

Patent application JP4103433 describes a system for controlling the distribution of torque in a four-wheel drive vehicle. This system comprises a torque distribution clutch, and means for detecting slip, vehicle speed and the difference in diameter of the tires of the four driving wheels. The system provides for reducing the slip by using the torque distribution clutch while taking account, where necessary, of a difference in diameter of the tires.

Patent application JP61275028 describes a system for increasing the maneuverability of a four-wheel drive vehicle, the wheels of which do not have exactly the same diameter. This system is fitted with speed detectors for the front and rear wheels, a device for distributing driving forces for the front and rear wheels, a subtracting system and a compensating device. It is thus possible to determine a rotation speed difference between the front and rear wheels, taking account of a compensation factor related to a difference in diameter. The ratio between the torques transmitted to the front and rear axle is then controlled based on the rotation speed difference.

These systems use a torque distribution control to reduce slip but nothing is provided to protect the coupling effectively in the event of a permanent slip. They furthermore do not provide for bypassing slips resulting from specific driving conditions. They do not propose a torque distribution control system integrated in the four-wheel drive management system.

A subject of the present invention is a torque distribution control method for a four-wheel drive motor vehicle which is capable of effectively protecting the coupling in the event of a permanent slip and, in particular, of preserving the coupling from overheating due to a permanent slip.

Another object of the present invention is to protect the coupling in the event of a permanent slip caused by a poor tire fitting, by a difference in diameter of the wheels, a slow puncture, and over- or under-inflating of tires.

An object of the invention is to detect a permanent slip and to distinguish it from a normal slip or from a slip associated with specific driving conditions.

Another object of the present invention is to protect the coupling without needlessly stopping the operation of the "four-wheel drive" mode according to an optimum and adjustable compromise between protecting the coupling and the availability of the "four-wheel drive" mode.

Another subject of the invention is a four-wheel drive vehicle fitted with a computer and a coupling controlled in such a way that it is protected in the event of a permanent slip.

According to a first aspect, there is proposed a method for controlling the distribution of torque between the two axles of a motor vehicle with four driving wheels mounted on two axles wherein the slip representing the difference in speed of the two axles is determined.

According to a general characteristic of this method, any transfer of torque to one of the two axles is suppressed when the average value of the slip over a configurable duration exceeds a threshold.

Thus, if the transfer of torque is achieved by means of an electronically controlled coupling, the coupling is protected by the fact that in the event of a slip between the front and rear axles, the coupling can be opened, thereby avoiding any risk of overheating. The opening of the coupling has the drawback of making unavailable to the driver any four-wheel drive mode. By using an average value of slip, peaks in slip, which can be associated with particular driving scenarios as well as from a part of the noise in the slip measurement system, are bypassed. The four-wheel drive system is therefore not interrupted in an untimely manner.

Preferably, the driving conditions of the vehicle are determined and the slip is determined only when certain driving conditions are fulfilled over said configurable duration.

The opening of the coupling must be carried out only in the event of a permanent slip and must not be considered if the detected slip is actually caused, for example, by the operation of the ABS (Anti-lock Braking System) or by a turn. For this reason, provision is made for detecting driving conditions. In the event that these conditions are not met, not only is the coupling not opened, but no computation is carried out. Computation resources are thus saved.

According to another, also preferred, implementation, a counter is incremented or decremented as a function of the determined slip, corresponding to the authorized maximum slip, and the suppression of the transfer of torque is brought about only when said counter reaches a first threshold.

Thus, the coupling is not opened in an untimely manner. It is necessary for the occurrences of permanent slip to take place a certain number of times for the opening to be realized. Also taken into account are conditions of a minor slip in order to make the opening of the coupling more difficult. This corresponds to the real operation of a coupling. Specifically, the temperature, a main factor for the deterioration of a coupling in the event of a permanent slip, decreases if there is no longer a slip state over a certain duration. By taking account of non-stressed periods, one converges to a real model of deterioration of a coupling. The coupling is not opened in an untimely manner, while at the same time ensuring an effective protection against events that can actually deteriorate the coupling. Thus, an optimum compromise is obtained between the desired protection of the coupling and the availability of the four-wheel drive mode.

According to one implementation, a test is performed on whether the average value of the slip over said configurable duration is greater than a second threshold and whether the amplitude of the variation in the slip over said configurable duration is less than a third threshold, and the counter is incremented if both tests are verified.

Thus, unforeseen events bringing about a significant variation in slip are not considered; only the stabilized slip associated with a problematic mechanical dimensioning such as a difference in rolling radius between the front and rear wheels is detected. Advantageously, this incrementing of the counter is validated only if the speed of the vehicle exceeds a predetermined threshold.

According to another implementation, a test is performed on whether the average value of the slip over said configurable duration is less than a fourth threshold equal to said second threshold minus a constant, and the counter is decremented only when the average value of the slip is less than the fourth threshold and the amplitude of the variation in the value of the slip over said configurable duration is less than a third threshold.

Thus, the decrementing is triggered only if the slip is in a stabilized phase, below the value of the second threshold. Thus, decrementing associated with a particular driving scenario or with the presence of measurement noise is avoided. In the event of an oscillating permanent slip, a succession of incrementing and decrementing phases, which would make the detection of the oscillating slip impossible, is avoided (hysteresis).

According to an advantageous implementation, in order to bring about the suppression of the transfer of torque, the coupling temperature and/or the transferred torque can also be taken into account.

Specifically, in the case of highly variable driving conditions, the configurable duration can become significant in comparison with the rapidity of variation in driving conditions. It is hence no longer possible to obtain driving conditions which remain favorable over said configurable duration. It is therefore no longer possible to increment or decrement the counter, and the permanent slip can no longer be detected. One solution can consist in shortening the configurable duration. However, a smaller configurable duration would bring about a four-wheel drive mode that is deactivated more regularly. To avoid this, additional means for detecting a possibility of deterioration (temperature and torque value transmitted) of the coupling provide for being able to detect a permanent slip while the driving conditions are highly variable without shortening the configurable duration. Thus, a compromise between availability of the four-wheel drive mode and protection of the coupling can be retained in favor of availability. In other words, the four-wheel drive mode is more available without a risk of destruction of the coupling, by virtue of the information from the heat detector and of the computation of the torque value transmitted.

According to an advantageous implementation, the slip is determined regardless of the operating mode (4×4, 4×2 or others) in order to not allow the off-road 4×4 mode with a permanent slip state.

It is preferable for the driver of the vehicle that the off-road four-wheel drive mode is not interrupted. This is because this mode can be engaged while the driver is performing obstacle-clearance maneuvers; a stopping of the four-wheel drive mode could therefore be very detrimental.

According to a second aspect, there is proposed a motor vehicle with four driving wheels mounted on two axles comprising a transfer shaft linked to the first axle and a controlled coupling capable of transferring a part of the torque from the transfer shaft to the second axle, means for determining the respective speeds of the two axles and a system for controlling the distribution of the torque capable of determining a slip value representing the difference in speed between the two axles and capable of controlling the coupling.

According to a general characteristic of this embodiment, the torque distribution control system is configured to control the coupling so as to suppress any transfer of torque via the coupling, when the average value of the slip over a configurable duration exceeds a threshold.

According to one embodiment, the vehicle comprises means for determining the driving conditions of the vehicle and the torque distribution control system is configured to determine the slip only when certain driving conditions are fulfilled over said configurable duration.

According to another embodiment, the torque distribution control system includes a counter which can be incremented or decremented as a function of the determined slip, only when said driving conditions are met over the configurable duration, and the torque distribution control system is also configured to suppress the transfer of torque only when said counter reaches a first threshold.

According to another embodiment, the coupling comprises a temperature sensor linked to the torque distribution control system.

The invention will be better understood by studying the detailed description of an embodiment taken by way of non-limiting example and illustrated by the accompanying drawings in which.

Figure 1:
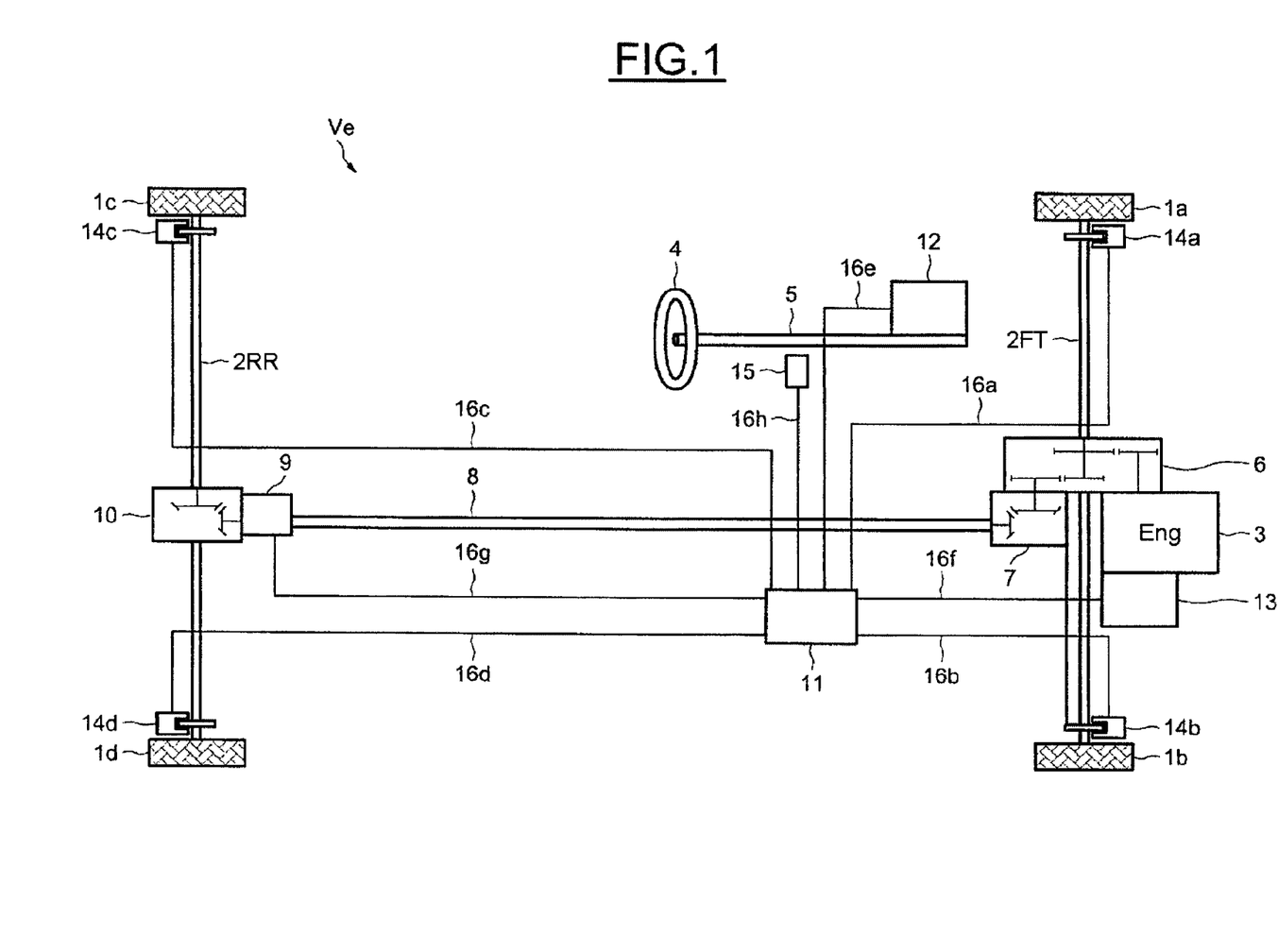
FIG. 1 schematically represents a four-wheel drive motor vehicle.

FIG. 1 schematically illustrates the main components of a four-wheel drive motor vehicle Ve with permanent transmission of engine torque to the front axle 2FT. This type of vehicle has been chosen by way of example. The engine of the vehicle can be a combustion engine 3, an electric motor or a hybrid combination. The permanent transmission of the engine torque could equally be exerted on the rear axle 2RR.

The vehicle comprises four wheels 1a, 1b, 1e, 1d, mounted respectively on a front axle 2FT and on a rear axle 2RR. The vehicle also includes a steering wheel 4 linked to a steering column 5. The vehicle further comprises a gearbox 6 transmitting the torque from the engine 3 to the front axle 2FT and to a front transfer case 7. A transfer shaft 8, driven by the transfer case 7, is linked via a coupling 9 to a rear-axle transfer case 10 so as to transfer a torque from the gearbox 6 to the rear axle 2RR.

The vehicle also comprises a computer 11 capable notably of controlling the coupling 9, a mode control device 12 and a control unit 13 for the engine 3 capable of monitoring the operation of the engine 3 (notably to determine the torque exerted by the engine and to estimate the engaged gear ratio). The vehicle also comprises four wheel speed sensors 14a, 14b, 14c, 14d, one on each of the wheels 1a, 1b, 1e, 1d.

The computer 11 is linked to each of the wheel speed sensors 14a ... 14d via connections 16a ... 16d enabling information exchange. As a variant, an ABS and/or AYC (Active Yaw Control) computer can provide the "wheel speed" signals. The computer 11 is also linked to the mode control device 12 via a connection 16e, to the engine control unit 13 via a connection 16f and to the coupling 9 via a connection 16g. The electrical connection 16g also provides for the flow of a control current to close the controlled coupling 9. A display unit on the instrument panel 15 is also linked via a connection 16h to the computer 11 in order to display to the driver of the vehicle the four-wheel drive operating mode used, in particular, and whether the coupling is overheating.

Specifically, the four-wheel drive vehicle can operate according to three different operating modes.

In a first operating mode, the gearbox 6 drives the front axle 2FT, the coupling 9 is open and does not transfer any torque to the rear-axle transfer case 10. This mode is called "4×2" mode, since only the two wheels 1a and 1b of the front axle are driven.

In a second operating mode, the gearbox 6 drives the front axle 2FT and the transfer shaft 8 drives the coupling 9 which is kept completely closed. The coupling 9 therefore drives the rear-axle transfer case 10 such that a part of the engine torque, which can range from zero to the maximum value of the torque that can be transmitted by the coupling, is transferred to the rear axle 2RR. This mode is called "off-road four-wheel drive".

In a third operating mode, the gearbox 6 drives the front axle 2FT and the transfer shaft 8 drives the coupling 9 which is controlled by the current from the computer 11 so as to be more or less closed depending on the torque demanded by each of the axles. Thus, a variable part of the engine torque is transferred to the rear axle 2RR. This mode is called "automatic four-wheel drive".

The various operating modes are dependent on the state of the coupling 9. The closure of the controlled coupling 9 is controlled by the computer 11 via the connection 16g. Thus, the level of torque transmitted from the transfer shaft 8 to the rear-axle transfer case 10 is controlled by the computer 11. To this end, the computer 11 receives information concerning:

the operation of the engine 3 by the engine control unit 13 via the link 16f;

the will of the driver of the vehicle by the mode control device 12 which can be operated by the driver. This information is transmitted to the computer 11 via the link 16e; and the speed of rotation of the four wheels 1a ... 1d as determined by the four wheel speed sensors 14a ... 14d. This information is transmitted to the computer 11 via the four links 16a ... 16d.

As a function of all this information, the computer 11 is capable of choosing the appropriate operating mode. The computer 11 is also capable of communicating to the vehicle driver information concerning the active operating mode via the display unit on the instrument panel 15 and the link 16h.

If the mode selected is automatic mode, the computer 11 is capable of determining the appropriate tightening level to be applied to the coupling 9. The links 16a ... 16g to which reference has been made can, by way of example embodiment, be the branches of a CAN (Controller Area Network) bus.

According to the invention, the computer 11 can further transmit, according to the information received, a control signal for completely opening the coupling 9 so as to avoid overheating and/or excessive wear of the coupling 9 in the event of a permanent slip.

Figure 2:
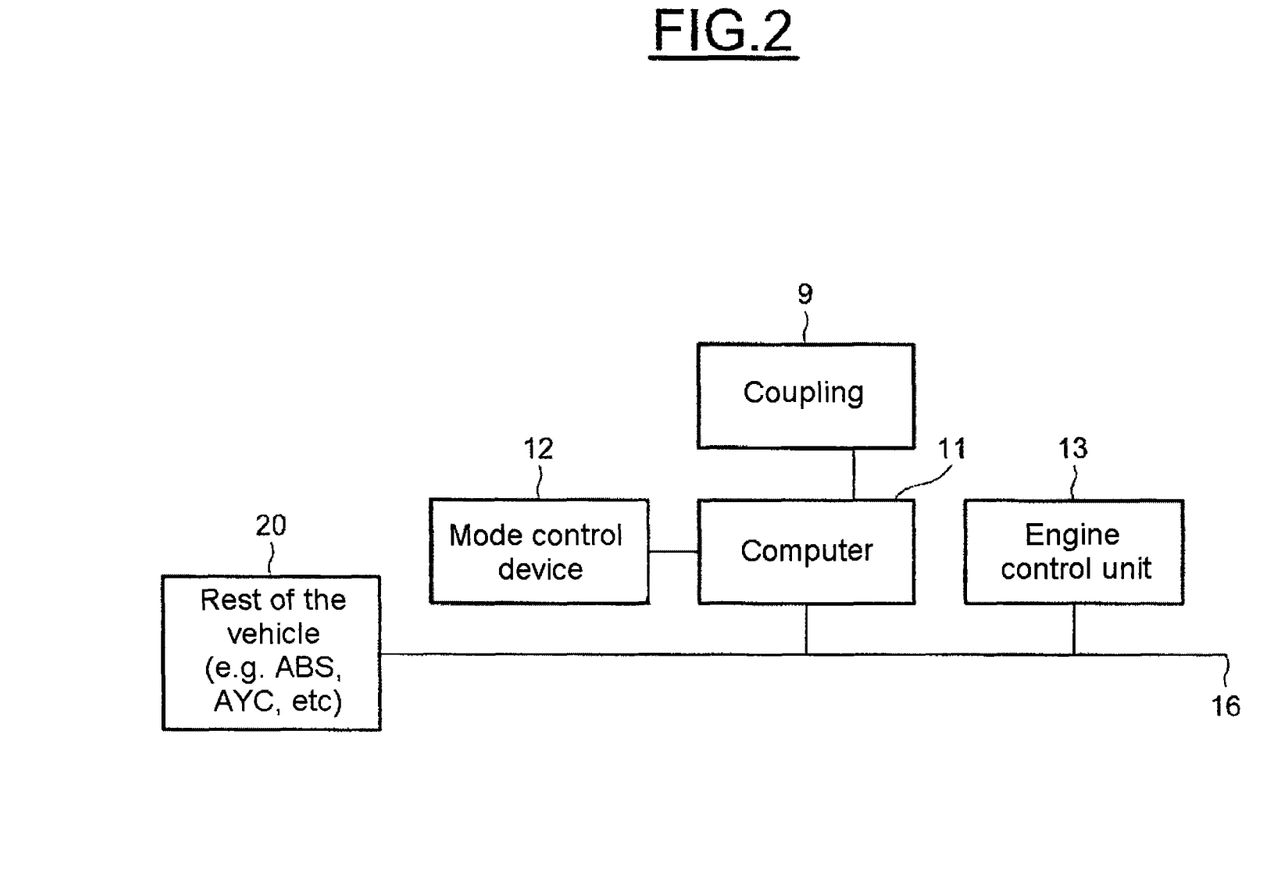
FIG. 2 schematically represents the main components of the control system for operating the vehicle.

FIG. 2 schematically illustrates the main components of the control system for operating the vehicle. The components already illustrated in FIG. 1 bear the same references.

In FIG. 2, there is also the computer 11 linked via the connection 16g to the coupling 9 and the mode control device 12 linked to the computer 11. The connection bus 16 provides for ensuring the links between the computer 11, the control unit 13 for the engine 3 and the rest of the vehicle command and control units represented in the form of a single block 20. Included among these units are, for example, an ABS braking system and an AYC (Active Yaw Control) trajectory control system.

The computer 11 can receive from the block 20 information relating to the driving conditions:

information relating to the braking of the vehicle: ABS braking system, parking brake, brake pedal.

information relating to the operation of the AYC trajectory control system.

The computer 11 can then, for example, send an opening control signal to the coupling via the electrical connection 16g as a function of the driving conditions, the will of the driver and the state of the coupling.

Figure 3:
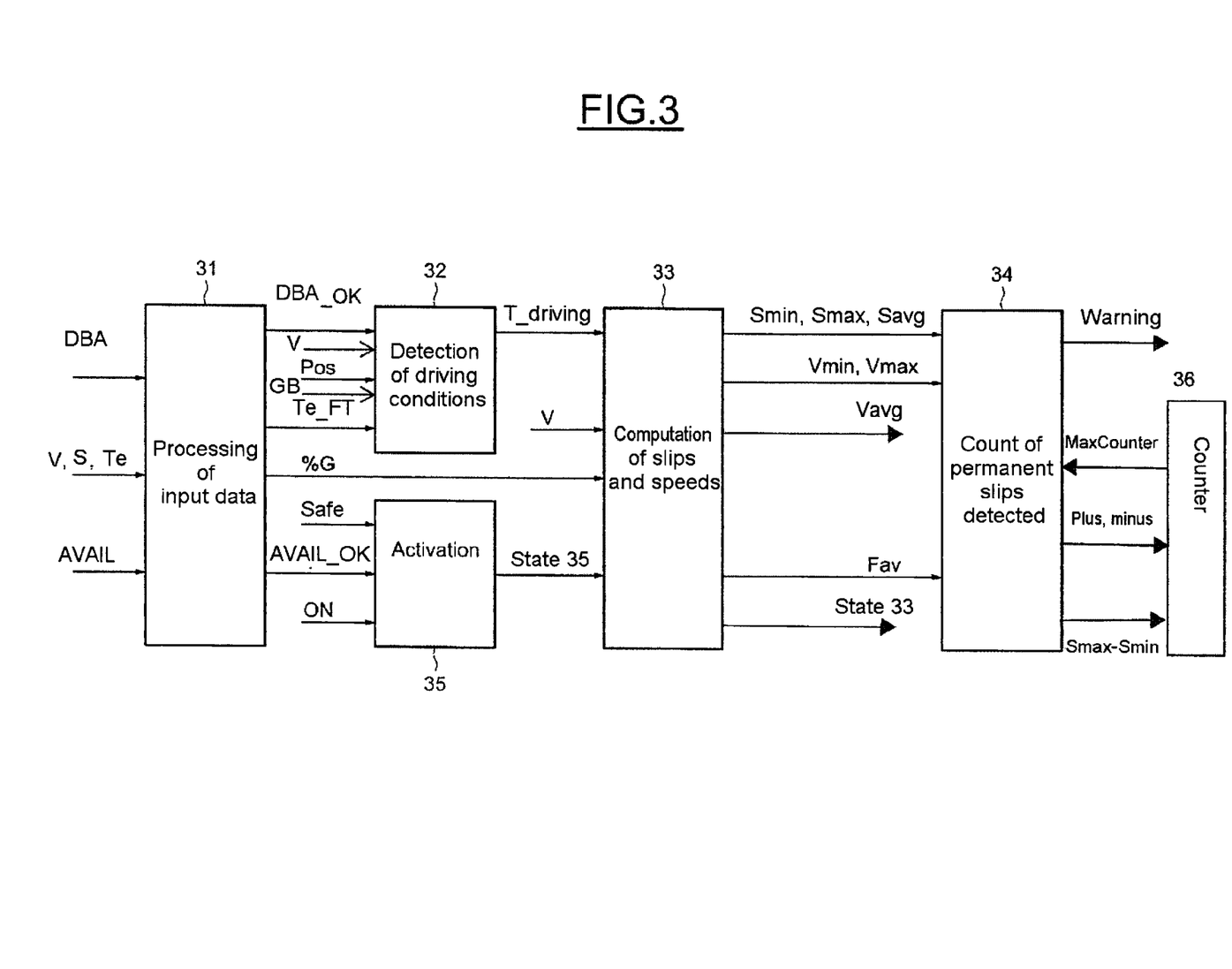
FIG. 3 schematically represents the main aspects of a software feature installed in the computer of the vehicle and providing protection of the coupling.

FIG. 3 schematically illustrates in block form the subfunctions of an opening decision software program for the coupling 9. The program can be integrated in the computer 11. In the example illustrated, a first processing block 31 receives as input variables relating to the operation of the vehicle. The processing block 31 notably receives:

variables denoted by DBA. They relate to the states of the driving and braking assistance systems. The variables DBA can be transmitted by one or many programs managing braking and assisting driving, which are located for example within the computer 11. The following can be included among the variables DBA:

a binary variable indicating the use of the ABS (Antilock Braking System);

a binary variable indicating the use of the AYC trajectory control;

a binary variable indicating the use of ASR (Acceleration Slip Regulation);

a binary variable indicating the use of the engine inertia torque control (MSR: MotorSchleppmomentRegler, a German term that is well known to the person skilled in the art); and a variable indicating the use of braking by the driver whether this is via the pedal or via the parking brake (handbrake).

Based on the variables DBA, the processing block 31 determines if at a given time there is no driving assistance (AYC, MSR, ASR), no braking assistance system (ABS) and no braking active. If this is the case, it forwards to the detection block 32 the binary value DBA_OK with the value 1.

The processing block 31 also receives variables V, S, Te relating, respectively, to the vehicle speed, the slip between the two axles and the torque supplied by the engine to the two axles. The variables V and S are supplied by the four wheel speed sensors 14*a*, 14*b*, 14*c*, 14*d* while the variable Te is supplied by the control unit 13 for the engine 3.

More specifically, the speed V of the vehicle Ve is estimated from the average of the speeds supplied by the two rear wheel speed sensors 14*c* and 14*d*. The slip between the two axles is estimated from the difference between two rotation speeds, that of the front axle 2FT and that of the rear axle 2RR. The speed of rotation of the front axle can, by way of example embodiment, be determined by working out the average of the speeds supplied by the two front wheel sensors 14*a*, 14*b*. Similarly, the speed of rotation of the rear axle can be determined by working out the average of the speeds supplied by the two rear wheel sensors 14*c* and 14*d*. Lastly, the engine torque Te is estimated by the control unit 13 for the engine 3. The control unit 13 also forwards an estimate of the engaged gear ratio.

From the variables V and S, the processing block 31 computes the slip expressed as a percentage with respect to the speed of the vehicle % S; it then transmits this value to a computation block 33. From the variable Te and from the estimate of the engaged gear ratio, the processing block 31 determines the torque exerted by the engine on the front axle Te_FT; it then transmits this value to the detection block 32.

The processing block 31 also receives variables AVAIL relating to the availability and validity of the input data; they are used to detect faults on the sensors or on the input data. Among the variables AVAIL, the following variables are included, for example:
- a binary state variable for the determination of the engine torque;
- a binary state variable for the detection of the engagement of a gear;
- a binary state variable for the detection of the position of the acceleration pedal;
- a binary state variable for the detection of the ABS;
- a binary state variable for the detection of the trajectory control (AYC);
- a binary state variable for the detection of the anti-skid measure (ASR);
- a binary state variable for the detection of the engine inertia torque regulation (MSR).

The processing block 31 also determines whether the speed sensors 14*a*, 14*b*, 14*c*, 14*d* are in working order and if the information that they transmit is in a useable state.

From these variables and from this information, the processing block 31 determines whether all the sensors are operating and all the variables required are available and valid. If necessary, it transmits to an activation block 35 a binary value, AVAIL_OK, relating to the availability of information.

The detection block 32 receives, in addition to the variables transmitted by the processing block 31, DBA_OK and Te_FT, variables V, Pos and GB. The variable V corresponds to the variable V at the input of the processing block 31. The variable Pos is a decimal variable, the value of which expresses the position of the acceleration pedal. This information is, for example, supplied by the control unit 13 for the engine 3. The variable GB is a binary variable which takes the value 1 if the gear ratio is definitely engaged in the gearbox 6. This information is, for example, supplied by the control unit 13 for the engine 3.

From the variables received, the detection block 32 is configured to detect whether the driving conditions to compute a permanent slip are satisfied. If the conditions are not satisfied, then the computation block 33 is not activated. This means that slip detection is carried out only when the driving conditions are satisfied. Thus, normal slips due to particular circumstances are not taken into account for permanent slip detection, such particular circumstances including, for example: shifting from a gear ratio, driving in a bend, braking, operation of a driving assistance function, lifting one's foot off the accelerator pedal, vehicle in full acceleration.

If necessary, the detection block 32 transmits to the computation block 33 a variable T_driving equal to 1. For the detection block 32 to transmit a variable T_driving, all the conditions below must be met:
- the variable DBA_OK is equal to 1; this provides for preventing the permanent slip computation from intervening in the event that the vehicle is undergoing braking or while a driving assistance or braking assistance system is active.
- the variable V is greater than a first threshold; this provides for preventing the permanent slip computation from intervening in the event that the vehicle is turning.
- the variable Pos is greater than a second threshold: this provides for preventing the permanent slip computation during occurrences of the driver lifting their foot off the accelerator.
- the variable GB is equal to 1: this provides for preventing the permanent slip computation from intervening while the vehicle is changing gear.
- the variable Te_FT is less than a third threshold: this provides for preventing the permanent slip computation from intervening while the vehicle is in full acceleration.

The three thresholds referred to are configurable. This means that the conditions for the detection of a permanent slip can be adapted according to the driving style of the driver or the driving terrain. For example, the minimum speed from which a slip detection is provided can be raised in the case of sports-style driving.

The activation block 35 receives, in addition to the variable AVAIL_OK, a safety variable Safe and an in-operation variable ON. The variable Safe is binary; it takes the value 1 if no fault from other computers or programs is detected. The variable ON is also binary; it takes the value 1 if the permanent slip warning function is in operation. From this information, the activation block 35 forwards to the computation block 33 an activation variable State 35. This variable takes the value 1 if the variables AVAIL_OK, Safe and ON have the value 1. Optionally, the activation block 35 can receive a value from the mode control device 12. If necessary, it forwards a value of State 35 equal to 1 only when automatic four-wheel drive mode is selected by the driver of the vehicle.

The computation block 33 receives, in addition to the variables T_driving, % S and State 35, a variable V. The variable V corresponds to the speed V at the input of the processing block 31. From the variable % S and from the speed V, the computation block 33 computes variables of speed Vmin, Vmax, Vavg and of slip Smin, Smax, Savg for the vehicle. The values 5 min, Smax, Savg correspond, respectively, to the minimum, maximum and average slip value over a configurable duration MinTime. The values Vmin, Vmax, Vavg correspond, respectively, to the minimum, maximum and average vehicle speed over the duration MinTime. These computations are carried out by the computation block 33 only when the binary values T_driving and State 35 are equal to 1.

The computation block 33 also computes a binary value Fav relating to the fulfillment of the conditions required. The value of Fav changes to 1 if the driving conditions T_driving are verified over the duration MinTime. The computation block 33 also computes a binary value State 33 on 2 bits corresponding to the state on a flow diagram of the sub-function of the computation block 33. Specifically, the sub-function of the block 33 can be represented in the form of a 4-state diagram:

state −1 corresponds to the default state of the block 33.
state 0 corresponds to an initialization state. The variables of speed and slip to be computed are initialized to 0.
state 1 is active as soon as the binary variable T_driving changes to 1, and is inactive as soon as the latter changes back to 0. As long as T_driving remains equal to 1, the variables of speed and slip are computed.
state 2 is active if the value T_driving is equal to 1 over a configurable minimum duration; the binary value Fav then changes from the value 0 to 1. It is at the instant of activation of this state 2 that the variables of speed and slip, and the variable Fav, are sent to a counting block 34.

The counting block 34 filters these variables to order if necessary the triggering of a permanent slip warning via the binary variable Warning. When the variable Warning changes to 1, the permanent slip warning is engaged. It is this warning which triggers the opening of the controlled coupling 9 by the computer 11 via the connection 16g. More specifically, the counting block 34 simultaneously detects a permanent slip, counts the occurrences of permanent slips and generates warnings. To this end, a counting block 34 cooperates with a counter 36. The counter 36 is controlled by the counting block 34 in order to be incremented (plus) on each occurrence of permanent slip detected. When the counter 36 reaches a configurable threshold MaxCounter, the value of the variable Warning changes to 1.

The incrementing (plus) intervenes as soon as the variable Fav is equal to 1, the amplitude of the variation in slip (Smax−Smin) over a duration MinTime is less than another configurable threshold (MaxDeltaSlip) and the average slip Savg over the duration MinTime is greater than a configurable threshold value MinWheelSlip. The counter can also be decremented (minus) when the variable Fav is equal to 1, the amplitude of the variation in slip (Smax−Smin) is less than MaxDeltaSlip over the duration MinTime and the average slip is less than a threshold equal to said second threshold minus a constant MinWheelSlip-Constant. The constant (Constant) can advantageously be chosen with a value related to the hysteresis (WheelSlipHyst).

The invention as it has been described provides an effective protection of the coupling without consuming many memory resources nor generating needless interruptions to the operation of the 4×4 mode. The invention for detecting a permanent slip can also be applied to revealing a problem which creates such a permanent slip. Thus, it is possible to detect tire wear, unsuitable tire pressure, or a load that is too high for the vehicle.

The values of the thresholds which engage favorable driving conditions are configurable; it is therefore possible to favor the non-interruption of the four-wheel drive mode over the protection of the coupling or vice versa. For example, the minimum speed in the computation block 33 can be lowered or the configurable duration MinTime can be increased to favor the protection of the coupling. It is thus possible to adjust the compromise of coupling protection/four-wheel drive mode availability.

The invention claimed is:

1. A method for controlling distribution of torque between two axles of a motor vehicle with four driving wheels mounted on the two axles, the method comprising:
electronically receiving data regarding a difference in speed of the two axles;
determining, using a processor, a slip representing the difference in speed of the two axles based on the electronically received data;
identifying, using the processor, the determined slip as a permanent slip;
suppressing, using the processor, any transfer of torque to one of the two axles when an average value of the permanent slip over a configurable duration exceeds a threshold;
performing a first test regarding whether the average value of the permanent slip over the configurable duration is greater than a second threshold and performing a second test regarding whether an amplitude of variation in the permanent slip over the configurable duration is less than a third threshold; and
incrementing a counter when both tests are verified,
wherein the counter is incremented or decremented as a function of the permanent slip, and said suppressing the transfer of torque is brought about only when the counter reaches a first threshold.

2. The method for controlling distribution of torque for a motor vehicle as claimed in claim 1, wherein driving conditions of the vehicle are determined and the slip is determined only when certain driving conditions are fulfilled over the configurable duration.

3. The method for controlling distribution of torque for a motor vehicle as claimed in claim 1, further comprising:
performing a third test regarding whether the average value of the permanent slip over the configurable duration is less than a fourth threshold equal to the second threshold minus a constant; and
decrementing the counter only when the average value of the permanent slip is less than the fourth threshold and the amplitude of variation in the permanent slip over the configurable duration is less than the third threshold.

4. The method for controlling distribution of torque for a motor vehicle as claimed in claim 1, wherein, to bring about said suppressing the transfer of torque, a coupling temperature and/or the transferred torque is taken into account.

5. The method for controlling distribution of torque for a motor vehicle as claimed in claim 2, wherein the slip is determined only when an automatic four-wheel drive mode, corresponding to a variable torque distribution between a front axle of the two axles and a rear axle of the two axles, is selected.

6. A torque distribution control system for controlling distribution of torque between a first axle and a second axle of a motor vehicle with four driving wheels mounted on the first and second axles, the system comprising:
a transfer shaft linked to the first axle and a controlled coupling configured to transfer a part of the torque from the transfer shaft to the second axle; and
processing circuitry configured
to control distribution of the torque,
to determine a slip value representing a difference in speed between the first and second axles,
to identify the determined slip as a permanent slip,
to control the controlled coupling based on received data regarding respective speeds of the first and second axles,
to control the controlled coupling to suppress any transfer of torque via the controlled coupling when an average value of the permanent slip over a configurable duration exceeds a threshold,
to perform a first test regarding whether the average value of the permanent slip over the configurable duration is greater than a second threshold, and to perform a second test regarding whether an amplitude of variation in the permanent slip over the configurable duration is less than a third threshold, and to increment a counter when both tests are verified, wherein the counter is incremented or decremented as a function of the permanent slip, and the controlled coupling to suppress the transfer of torque is brought about only when the counter reaches a first threshold.

7. The system as claimed in claim 6, wherein the processing circuitry is configured to determine driving conditions of the motor vehicle, and to determine the slip only when certain driving conditions are fulfilled over the configurable duration.

8. The system as claimed in claim 7, wherein the counter is incremented or decremented as a function of the permanent slip only when the certain driving conditions are met over the configurable duration.

9. The system as claimed in claim 6, wherein the controlled coupling includes a temperature sensor.

* * * * *